Jan. 25, 1949.  E. H. WORTHINGTON  2,460,111
LAWN MOWER FLY KNIFE
Filed Jan. 18, 1946

INVENTOR
EDWARD H. WORTHINGTON
BY
John E. Hubbell
ATTORNEY

Patented Jan. 25, 1949

2,460,111

UNITED STATES PATENT OFFICE 2,460,111

LAWN MOWER FLY KNIFE

Edward H. Worthington, East Stroudsburg, Pa.

Application January 18, 1946, Serial No. 641,925

7 Claims. (Cl. 56—294)

The general object of the present invention is to provide an improved rotary cutting element of the type used in most lawnmowers and commonly called a fly knife. The fly knife type of cutting element comprises a plurality of helical cutting blades and a plurality of spaced apart coaxial spider elements, to circumferentially spaced portions of each of which the various cutter blades are attached. The primary object of the present invention is to provide a fly knife characterized by improvements in the mode of attaching the blades to the spider elements.

Heretofore, it has been the usual practice of most manufacturers of lawnmower fly knives to rivet the cutter blades to integral portions of each spider, which extend laterally away from the body portion of the spider. Some use has also been made of fly knives in which each spider comprises a disc-like body formed with circumferentially distributed slots in each of which a corresponding blade portion is received and welded by an arc-welding process.

A specific object of the present invention is to provide a fly knife in which the cutting blades are received in the slots of slotted spiders and are welded to the spiders in such manner as to give the fly knife greater inherent strength than is possessed by the prior fly knives having their blades and spiders welded together, and in which the required welding operations may be simpler and less expensive than those employed in making said prior fly knives.

Another and more specific object of the invention is to provide a simple and effective fly knife structure in which the blades are seated in slots formed in the spiders and are spot welded at points laterally displaced from the spider bodies to lateral projections from said bodies. Such lateral projections may be integral flange portions of the spiders in some cases, but in a desirable form of the invention, the projections are separately formed angle pieces each comprising one leg alongside and welded to the corresponding spider body, and comprising a second leg which extends through a slot in said body alongside the blade received in that slot, and is welded to said blade at least at one point which is laterally displaced from the body of the spider.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Figure 1:
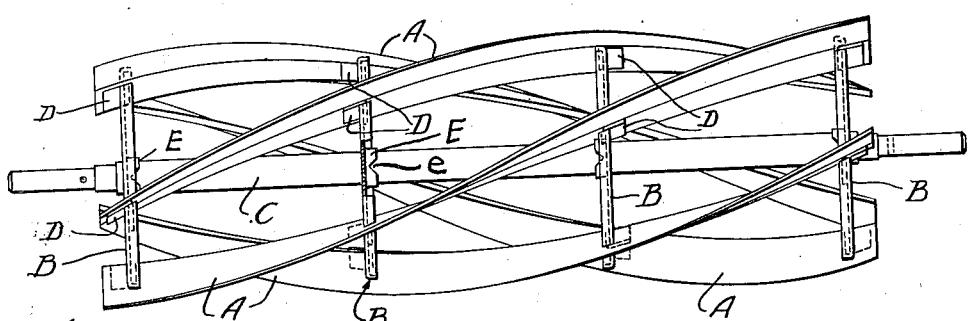
Fig. 1 is a side elevation.
Figure 2:
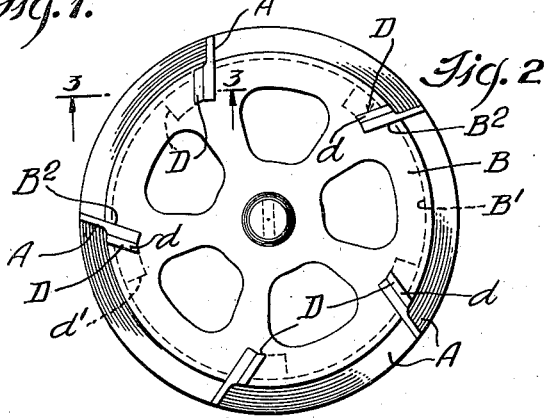
Fig. 2 is an end elevation of the fly knife shown in Fig. 1.

In Figs. 1 and 2 I have illustrated by way of example a lawnmower fly knife which is of conventional type and form, except in respect to novel connections between the helical cutting blades A and the coaxial spaced apart spider elements B of the fly knife, provided in accordance with the present invention. As shown, each spider B comprises a body portion in the form of an apertured disc and a rim flange portion B' extending laterally away from the body of the spider. The spider bodies are formed with central apertures through which the fly knife shaft C extends. The spiders B may be secured in place on the shaft C in any suitable manner, as by shrinking them on the shaft or by welding them thereon.

As shown, the helical cutter blades A are equally spaced about the axis of the cutter, and each is received in a corresponding slot $B^2$ in each spider B. As shown, the side walls of each slot $B^2$ are parallel to one another and are respectively tangential to circles which are coaxial with the fly knife, and considerably smaller in diameter than the spiders B.

Figure 3:
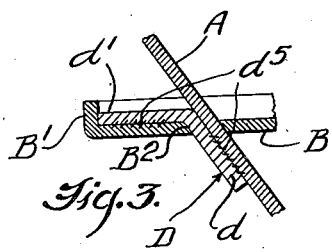
Fig. 3 is a section on the line 3—3 of Fig. 2.

In the preferred construction shown in Figs. 1, 2 and 3, the width of each slot $B^2$ exceeds the width of the portion of the cutting blade received in the slot by an amount equal to the thickness of a corresponding angle part D which extends through the slot and has one leg $d$ alongside and in contact with the blade. Each such angle part has a second leg $d'$ which extends away from the slot alongside the body of the spider. Each angle part leg $d$ is welded to the portion of the blade A alongside it, and each angle part leg $d'$ is welded to the portion of the spider B alongside that leg. With the described construction, each angle part D may have each of its legs spot welded to the corresponding blade or spider element so as to form at least one welded joint portion $d^5$ uniting each of the legs $d$ and $d'$ to the respectively corresponding blade A and spider B and displaced from the adjacent slot $B^2$. The welded joints so displaced from the spider slot portions insure suitably strong connections between the blades and spiders, while permitting the blades, spiders and angle parts to be made of relatively thin metal.

The invention, in its broader aspects, is not concerned with the materials or modes of construction used in forming the parts A, B and D. In ordinary practice, however, the cutting blades are helically twisted bars of suitable cutting steel, the spiders B are stamped or pressed metal plate parts, and the angle parts D are die forged or stamped or pressed from metal bar or plate stock.

As previously noted, the construction shown in Figs. 1, 2 and 3 permits the angle parts to be connected to the cutter blades and spiders by spot welding. That method of welding is cheaper than arc welding and is practically satisfactory. Major advantages of the invention are obtainable with other welding methods, however, and in particular by the use of the so-called fusion method of connecting metal parts. The strength of the blade and spider connection shown in Figs. 1, 2 and 3 is insured by the fact that it is practically feasible to shape and proportion the parts so that the portions of the blade A and angle part D extending through each slot $B^2$ fit snugly between the side walls of the slot, and so that the inner edge of the blade bears directly against the inner end, or bottom, wall of the slot.

Merely by way of illustration and example, it is noted that the fly knife shown in Figs. 1 and 2 has five blades A and four spiders B, and associated angle parts are shaped and proportioned in a manner suitable for use in a fly knife having an effective cutting length of eighteen or twenty inches, with cutting edges of the blades A defining a cylindrical surface of a revolution six inches or so in diameter. As those skilled in the art will understand, however, the general type and form of construction shown in Figs. 1 and 2 is well adapted for use in fly knives of greater or lesser lengths and diameters than those just stated by way of example. Those skilled in the art will also understand that, in accordance with the customary practice of the art, more spiders B will ordinarily be included in a relatively long fly knife than in a relatively short fly knife, and more blades will ordinarily be used in a fly knife of relatively large diameter than in a fly knife of relatively small diameter.

Figures 4, 5, 6:
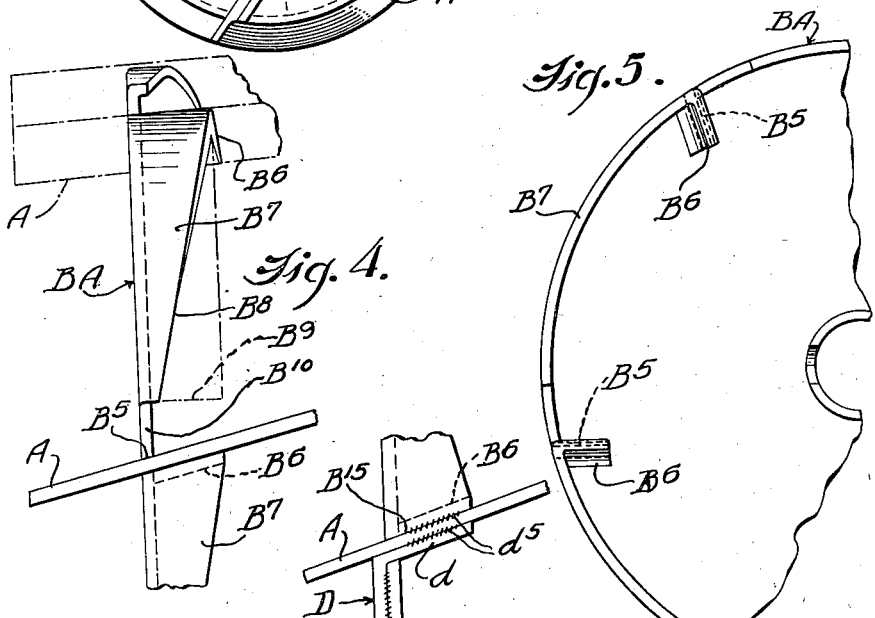
Fig. 4 is a side elevation of a portion of a fly knife of modified form.
Fig. 5 is an end elevation of the fly knife portion shown in Fig. 4.
Fig. 6 is an elevation taken similarly to Fig. 4 illustrating a modification of the arrangement shown in Figs. 4 and 5.

The general principles of the present invention may be used in fly knives differing in construction, and one modification of the construction shown in Figs. 1, 2 and 3 is shown in Figs. 4 and 5, and another modification is shown in Fig. 6. In the modification illustrated in Figs. 4 and 5, separately formed angle parts D are not used, and each spider BA has its blade receiving slots $B^5$ of such width that the side walls of each slot engage the opposite sides of the inserted blade, and each blade A is welded to an integral lateral projection $B^6$ from the spider body. Furthermore, in lieu of the continuous rim flange $B'$ of the spiders B of Figs. 1, 2 and 3, the spider BA is formed with a series of integral lateral branches $B^7$, each of which may be regarded as an integral cylindrically extending projection from the periphery of the body of the spider, which is integrally connected to the outer end portion of the corresponding projection $B^6$.

In practice, the parts $B^6$ and $B^7$ of each spider BA may be formed, as indicated in Fig. 4, from a pressed metal plate spider blank similar in form to the spider B of the construction first described, except that the axial extent of the rim flange may well be relatively greater in the construction shown in Figs. 4 and 5 than in the construction first described. In forming the spider BA in the manner indicated in Fig. 4, triangular portions of the rim flange of the blank, respectively alongside the different projections $B^7$, are cut away along shear lines $B^8$ and $B^9$. The cut along each line $B^8$ forms the side edge of a corresponding projection $B^7$ and is inclined to the body of the spider. The cut along each line $B^9$ forms the inner edge of the adjacent projection $B^6$. In addition to the blank shearing cut along the corresponding line $B^9$, the formation of each projection $B^6$ comprises a shearing cut along the line $B^{10}$ and the in-bending of the rim portion of the blank between the shear line $B^9$ and the remote side of the adjacent slot B, to form the corresponding projection $B^6$.

The triangular form of each projection $B^7$ facilitates the proper location of the electrodes used in welding the blades A to the projections $B^6$.

The modification shown in Fig. 6 includes angle parts D of the type shown in Figs. 1–3, and each having one leg extending through a slot $B^{15}$ in a spider BB. The spider BB may be exactly like the spider BA of Figs. 4 and 5, except that each of its blade receiving slots $B^{15}$ is of a width great enough to receive a corresponding blade A and the angle part leg $d$ alongside the blade. In the arrangement shown in Fig. 6, the angle parts D are each welded to the spider body and to a corresponding blade A as in Figs. 1–3, and in addition each blade A is welded to the adjacent integral projection $B^6$ from the body of the spider BB. Each blade A may be welded to an adjacent spider portion $B^6$ and to the corresponding angle part D by the same spot welding operation. As shown in Fig. 6, each spider projection $B^6$ and associated projection $B^7$ are located at the opposite side of the adjacent blade receiving slot in the spider body, from that at which the projections $B^6$ and $B^7$ are located in Figs. 4 and 5. Advantageously and as shown, each spider B is formed with an integral hub flange E having an an edge notch $e$ which facilitates the spot welding of the flange E to the shaft C by the use of a welding electrode extending in to the notch space.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. A fly knife comprising helical cutting blades and spaced apart preformed spiders, each of which is formed with a plurality of circumferential distributed blade receiving slots and with a rigidly attached portion adjacent each slot which extends alongside of the blade received in said slot, said blade having a portion of one side surface abutting against one side wall of said slot and having a portion of its opposite side surface abutting against and welded to a side of said rigidly attached portion.

2. A fly knife comprising a plurality of helical cutting blades and a plurality of spaced apart spiders, each of which comprises a preformed disc-like body having circumferentially distributed slots respectively receiving portions of the different blades and also comprises a portion adjacent each slot which extends laterally away from, and is rigidly attached to the body of the spider and has a side surface which engages a longitudinally extended portion of one side surface of the blade received in the adjacent slot and is spot-welded thereto, said blade having a portion of its opposite side surface abutting against an adjacent side wall of said slot.

3. A fly knife as specified in claim 1, in which each lateral projection from the spider body is formed by one leg of a preformed angle part which is spot-welded to a portion of the blade received in the adjacent slot and has a second leg welded to said spider.

4. A fly knife as specified in claim 1, in which each lateral projection from the spider body is formed by one leg of a preformed angle part which extends through the adjacent slot and is spot-welded to a portion of the blade received in said slot, and has a second leg welded to said spider.

5. A fly knife comprising a plurality of helical cutting blades and a plurality of spaced apart spiders, each of which comprises a disc-like body preformed with circumferentially distributed slots respectively receiving portions of the different blades and each of which comprises an integral projection adjacent each slot which extends laterally away from the body of the spider and has a side surface alongside and in contact with and spot-welded to a longitudinally extending portion of one side of the blade received in the adjacent slot, said blade having a portion of its opposite side in abutting relation with the adjacent side wall of the slot.

6. A fly knife comprising a plurality of helical cutting blades and a plurality of spaced apart spiders, each of which comprises a disc-like body formed with circumferentially distributed slots respectively receiving portions of the different blades and each of which comprises an integral projection including a portion adjacent each slot which extends laterally away from the body of the spider and is alongside and in contact with and spot-welded to a longitudinally extending portion of one side of the blade received in the adjacent slot, said blade having a portion of its opposite side in abutting relation with the adjacent side wall of the slot, said projection also including a portion extending transversely away from said blade and slot adjacent the periphery of the spider.

7. A fly knife comprising helical cutting blades and spaced apart preformed spiders, each of which is formed with a plurality of circumferentially distributed blade receiving slots and with a rigidly attached portion adjacent each slot which extends alongside of the blade received in said slot, said blade having a portion of its inner edge surface abutting against the bottom wall of said slot and having a side surface abutting against and spot-welded to a side of said portion.

EDWARD H. WORTHINGTON.

REFERENCES CITED

The following references are of record in the file of this patent:

UNITED STATES PATENTS

| Number | Name | Date |
| --- | --- | --- |
| 2,043,098 | Funk | June 2, 1936 |
| 2,185,833 | Clemson | Jan. 2, 1940 |
| 2,266,308 | Clemson | Dec. 16, 1941 |